United States Patent [19]

Mantley

[11] Patent Number: 4,472,144

[45] Date of Patent: Sep. 18, 1984

[54] CELESTIAL COMPASS HAVING ROTATABLE MEANS FOR ORGANIZING TWO DISTINCT SETS OF ASTROLOGICAL DATA

[76] Inventor: Clay F. Mantley, 4121 Longridge Ave., Sherman Oaks, L.A., Calif. 91423

[21] Appl. No.: 475,518

[22] Filed: Mar. 15, 1983

[51] Int. Cl.³ .............................................. G09B 29/00
[52] U.S. Cl. .................................................... 434/106
[58] Field of Search .............. 434/106, 174, 198, 402, 434/404; 273/141 R, 142 R, 142 H, 142 HA

[56] References Cited

U.S. PATENT DOCUMENTS

| | | | |
|---|---|---|---|
| 1,592,877 | 7/1926 | Weston | 273/141 R |
| 2,315,316 | 3/1943 | Cissna | 434/106 |
| 3,992,787 | 11/1976 | Lynch | 434/106 |
| 4,193,213 | 3/1980 | Suda | 434/106 |
| 4,195,424 | 4/1980 | Heath | 434/106 |

Primary Examiner—William H. Grieb
Attorney, Agent, or Firm—Bromberg, Sunstein & McGregor

[57] ABSTRACT

A celestial compass includes first and second wheels bearing like astrological reference data in the form of the Zodiac. First and second sets of data to be evaluated as to astrological significance are placed on the first and second wheels respectively. The wheels are of small and relatively large diameters so that when secured to one another at a common center in a manner such that the like reference data are aligned and the first and second sets of data are exposed to view, an empty band is observed on the second wheel just beyond the periphery of the first. A transparent dial bearing degree of arc markings and major and minor planetary aspect symbols in a band corresponding to the exposed band is provided for rotation about the common center. The dial organizes the sets of data for providing a basis for astrological predictions.

10 Claims, 5 Drawing Figures

| SYMBOL | NAME | ABBREVIATION |
|---|---|---|
| M. I. | MERIDIAN | M |
| A. D. | ASCENDANT | AS |
| ☉ | SUN | SU |
| ☾ | MOON | MO |
| ☿ | MERCURY | ME |
| ♀ | VENUS | VE |
| ♂ | MARS | MA |
| ♃ | JUPITER | JU |
| ♄ | SATURN | SA |
| ♅ | URANUS | UR |
| ♆ | NEPTUNE | NE |
| ♇ | PLUTO | PL |
| ⚵ | CUPIDO | CU |
| ⊕ | HADES | HA |
| ⚷ | ZEUS | ZE |
| ⚴ | KRONOS | KR |
| ☊ ☋ | NODE | NO |
| ⚶ | APOLLON | AP |
| ⚳ | ADMETOS | AD |
| ⚸ | VULCANUS | VU |
| ⚯ | POSEIDON | PO |
| ♈ | ARIES POINT | AR |

*Fig. 5*

CELESTIAL COMPASS HAVING ROTATABLE MEANS FOR ORGANIZING TWO DISTINCT SETS OF ASTROLOGICAL DATA

FIELD OF THE INVENTION

This invention relates to a celestial compass and more particularly to a reusable astrology chart which provides detailed horoscope relationships at a glance.

BACKGROUND OF THE INVENTION

The science of astrology is based upon the significance of, as well as the positions of, the heavenly bodies at any given time. The science assigns an astrological identity to each individual based on parameters determined as of the time and date of birth of the individual according to the position of those bodies at that time.

The parameters for an individual are defined in terms of the angular and time comparisons between various ones of the heavenly bodies. In accordance with the science, on any given day an individual is benefited by planning his activities to correspond to favorable positions of the heavenly bodies on that day. The positions of the heavenly bodies which are favorable to an individual depend on the astrological identity of that individual. Consequently, it is a considerable task and requires a high degree of skill to specify the most opportune times for activities of a particular individual. The cost and effort involved in such astrological determinations have constrained the application of astrological determinations to mostly the most noteworthy of events.

The determinations are made even more complicated when they involve more than one individual. In such cases, two or more astrological identities have to be considered, a task sufficiently complicated that unskilled persons proceed only with the greatest caution.

Astrological comparison devices are available to organize available astrological data so that astrological determinations can be made relatively quickly. U.S. Pat. No. 3,992,787 issued Nov. 23, 1976 to J. P. Lynch discloses one such device. The device includes a base wheel having a relatively large diameter as well as an inner wheel of relatively small diameter free to move about a common center relative to one another.

The surface of the base wheel is divided into twelve segments each corresponding to one of the signs of the zodiac. Each segment, in turn, is again divided into thirty subsegments corresponding to the thirty days in the astrological month. A symbol is placed adjacent each of the twelve segments. These symbols along with the various markings constitute a zodiac chart on the surface of the base wheel.

The Lynch device also includes a spoked wheel between the base and inner wheels. The spoked wheel is also free to rotate with respect to the inner and base wheels about the common center. The spokes overlie portions of the base wheel and are rotated to a particular position, relative to the Zodiac, representing the time and date of birth of the user.

The device also includes an identifying member adjacent the spoked wheel which can be rotated about the common center. The identifying member is rotated to the segment of the Zodiac which corresponds to the birth date and time for a second individual. The compatability of the user to the second individual is indicated by the relative distances between the movable end of the identifying member and the spokes of the spoked wheel.

The inner wheel bears, on its exposed face, numerals designating various times of the day. That face also is divided into segments each relating to various qualities of life such as an individual's aspirations or habits. The inner wheel is rotated until the time of day corresponding to the user's time of birth is positioned in a particular location with respect to the Zodiac. The times at which the user's qualities are favorable and unfavorable are determined by the proximity to the spokes of the spoked wheel.

Other devices of this type are known. One, for example, is disclosed in U.S. Pat. No. 4,195,424, issued Apr. 1, 1980 to J. A. Heath. Another is disclosed in U.S. Pat. No. 4,193,213, issued Mar. 18, 1980 to K. Suda. Each of these patents describes a device with base plates and transparant wheels rotatable with respect to the base plates. In each case, the base plate is divided into twelve segments representing the Zodiac and the transparent wheel is employed to represent the birth information of a user.

In a sense, the Zodiac may be described as a top view of the solar system with the sun at its center. The various heavenly bodies, in this format, occupy various segments of the circular arc which surrounds the sun. As the heavenly bodies move, the instantaneous positions of those bodies can be defined in relationship to the sun in terms of the particular segment of the Zodiac wheel they happen to occupy at the time. If the earth is thought of as having its center coincident with the center of the sun in this representation, the heavenly bodies can be represented as occupying segments of circular arc around the earth; the earth's moon can also be so represented.

The sun and planets may be thought of as revolving around the earth following a circular arc of three hundred and sixty degrees. This circular arc can be thought of as divided into twelve equal segments each subtending an arc of thirty degrees. In astrology, the position of a heavenly body is specified by the segment to which the position of the body corresponds at a selected point in time. The twelve segments are commonly referred to as signs and are known as Aries, Taurus, Gemini, Cancer, Leo, Virgo, Libra, Scorpio, Saggitarius, Capricorn, Aquarius and Pisces in counter-clockwise order. Familier Greek letters or symbols are associated with the houses. The segments are further broken down into thirty subsegments each corresponding to one degree of arc. The position of a heavenly body accordingly can be accurately defined by the number of degrees between its location and the boundary of the particular sign in which it is located.

Certain life factors are influenced by the positions of heavenly bodies in a particular sign as is well known in astrology. Each sign also is known to be "ruled" by a particular planet. The above-mentioned U.S. Pat. No. 3,992,787 includes a clear discussion of the Zodiac, houses, ruling planets and the significance of the positions of the planetary bodies on related life factors. The base and spoked wheels of that patent thus organize birth data with respect to the Zodiac in a manner to provide guidance for daily action of a user.

But astrological devices of the type described are set for a particular user and are relatively difficult to change for different users. Moreover, the devices require a degree of dexterity to arrange various wheels to arrange various data for consideration as to their astrological significance.

BRIEF DESCRIPTION OF THE INVENTION

In accordance with the present invention, a celestial compass assembly is provided whereby a base wheel and an inner wheel can be secured to one another at a common center. Both wheels bear like markings of the Zodiac and the inner wheel is of a diameter smaller than the base wheel to expose an outer portion of the base wheel when secured to it. An outer band of the exposed portion of the base wheel is marked with the planetary positions at the time and date of birth of the user. The inner wheel is marked along a peripheral band with the planetary positions as of a chosen date. The two wheels are then secured with the Zodiac markings aligned and bearing an exposed band between the outer edge of the inner wheel and the peripheral band of the base wheel.

A transparant plate overlies the two wheels and is adapted to rotate about the common center. The plate includes markings which align with the exposed band. The markings represent the days of the astrological months as well as symbols positioned to mark major and minor aspects. The positions of the data to be compared, e.g. birth data and selected date data, are fixed with respect to like (Zodiac) reference data and the transparant plate acts like a dial to rotate a (0 degree) reference symbol to align with a chosen planetary factor.

The spacings between the positions of other planets with respect to the major aspect symbols on the dial (within five degrees) and with respect to the minor aspect symbols on the dial (within a degree) provide guidance for action of the user.

The base wheel is made of paper and is set on a plastic base conveniently of like diameter and made of rigid plastic. Thus, the compass can be used by a different person merely by substituting a base wheel with the birth data for that person in each instance. Similarly, the chosen date data on the inner wheel can be used for any user since it is not user specific. Moreover, the inner wheel can be made of paper and can be changed easily. Accordingly, the compass can be adapted to use by a number of people and for successive use by the same or different users expeditiously.

Importantly, the markings, with respect to which the various data on the inner and base wheels are organized into indications of success or failure, appear on the dial which is common to all users. Accordingly, a compass in accordance with this invention provides a dial with markings for organizing first and second sets of data in astrological form, first and second means for representing the sets of data in the context of like astrological markings and means for aligning the sets of data in a manner to permit the dial to organize the two sets of data.

The base wheel is user specific once the planet symbols and positions are marked on it. Consequently, a "prepared" base wheel can be used by a user repeatedly merely by placing the wheel over a spindle at the center of the plastic base.

Comparison of the data on the base wheel with (user non-specific) data on an inner wheel via the dial is made possible by the like general format of the markings on the two wheels. First, the two wheels are marked alike with symbols and degree markings to represent the Zodiac. This like marking is to permit the two sets of data to be represented in a like manner with respect to a like reference. But also the relative size of the wheel permits the dial to rotate the organizing indications on the dial in a band between the representations of the two sets of data. Third, it is important that the wheels include bands of successively larger diameter, each with like markings representative of degrees of arc. In the absence of those representations in bands of different diameters, the two sets of data on the two wheels could not be arranged in a manner to permit organization into a meaningful recommendation by the markings on the dial.

The use of first and second wheels of like reference format and different diameters for placing sets of data for comparison is considered a significant departure from prior art teaching.

BRIEF DESCRIPTION OF THE DRAWINGS

FIG. 5 is a chart of astrological symbols, their names and abbreviations.

DETAILED DESCRIPTION

Figure 1:
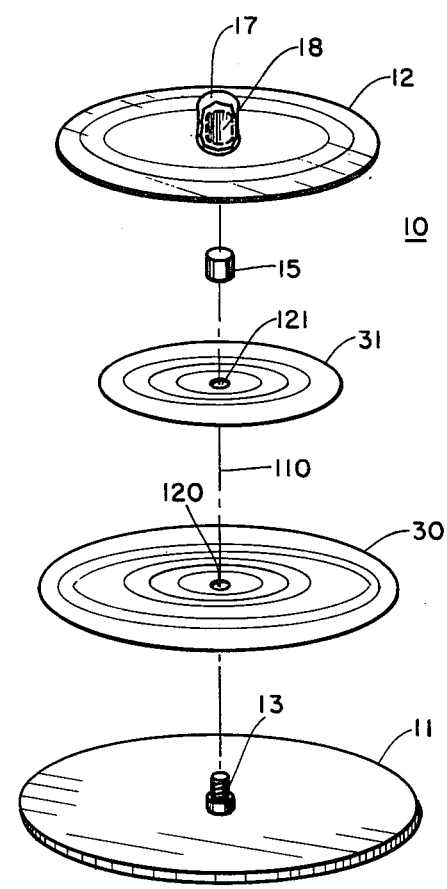
FIG. 1 is an exploded view of a celestial compass in accordance with this invention.

FIG. 1 shows an exploded view of a celestial compass 10 in accordance with this invention. The compass includes a base 11 and a dial 12. Base 11 includes a bolt 13 secured to it at its center. Nut 15 is adapted to be secured to bolt 13 and to provide a top surface on which dial 12 is free to rotate about an axis 110. In practice, dial 12 includes a handle 17 adapted by means of recess 18 to mate with nut 15.

Figure 2:
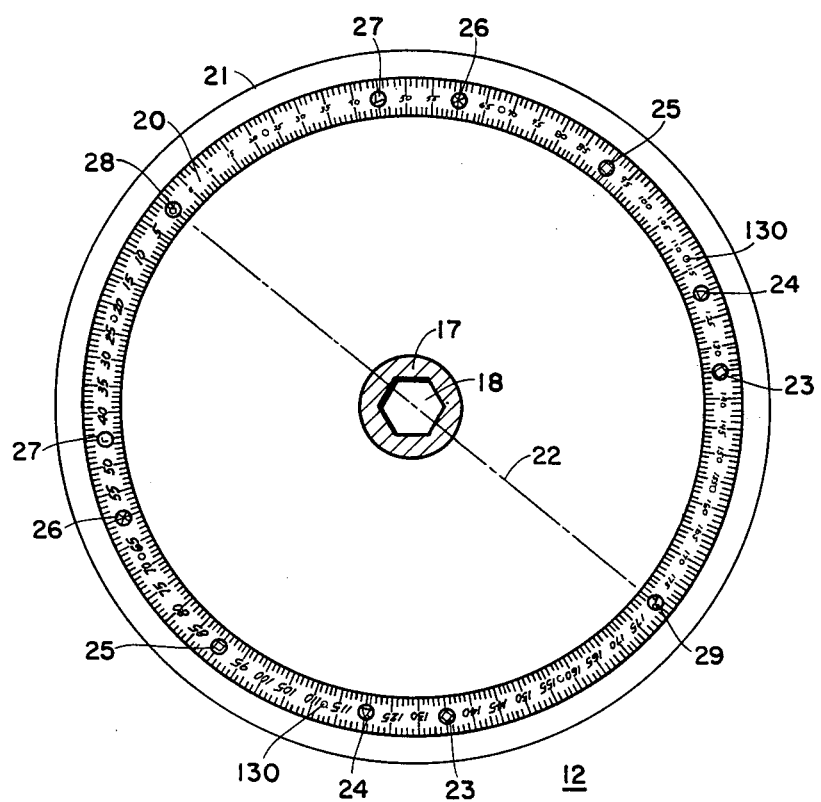
FIGS. 2, 3, and 4 are top views of portions of the apparatus of FIG. 1.

Dial 12 includes a band 20 close to its periphery 21 as shown in FIG. 2. The band bears symmetrical linear markings representing degrees of arc from 1° to 180° to the right and to the left of a line 22 through the center. The band also includes two identical sets of symbols 23, 24 . . . 27 corresponding to 135°, 120°, 90°, 60° and 45° of arc respectively. Additional unlike symbols 28 and 29 correspond to the zero and 180° positions respectively.

Figure 3:
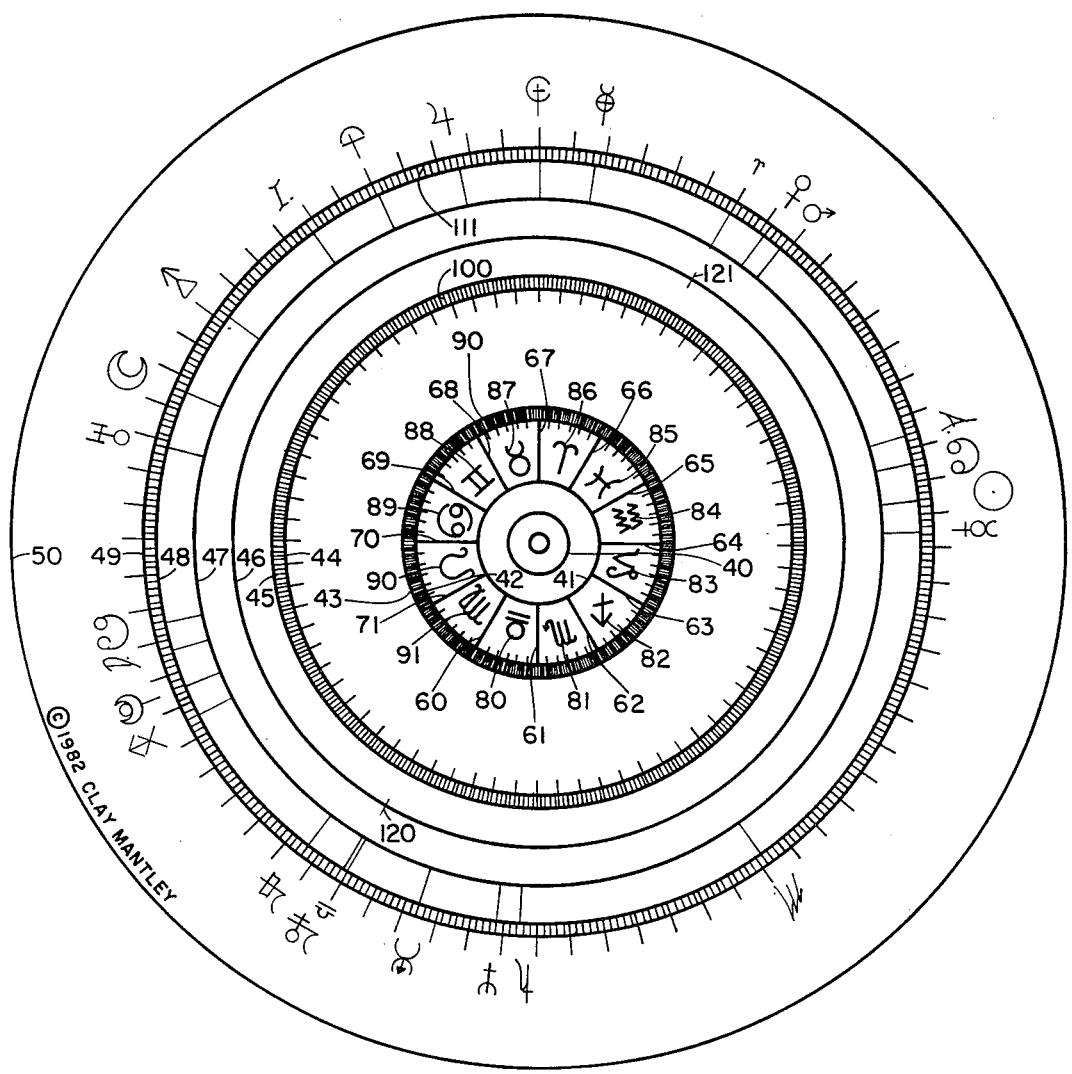
Figure 4:
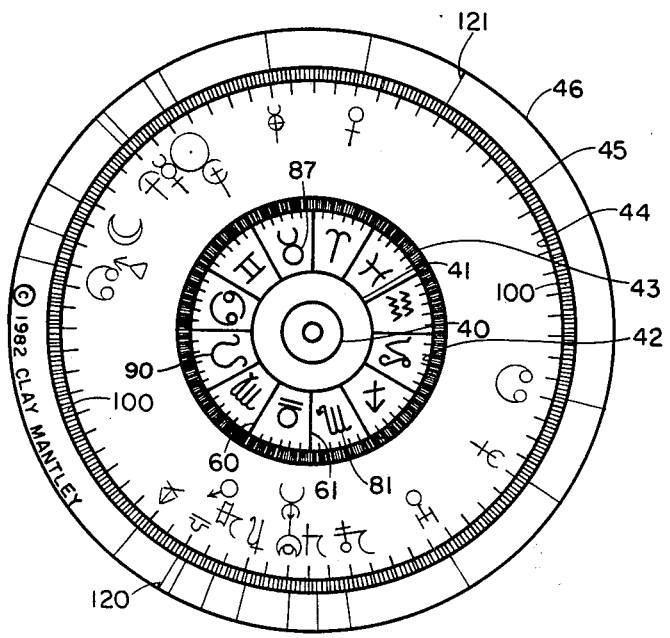

The celestial compass is adapted to receive first and second chart forms which we refer to as a base wheel and inner wheel. The base wheel and inner wheel are identified at 30 and 31 of FIG. 1. FIGS. 3 and 4 show top views of the base and inner wheel respectively. It is to be noted that the inner wheel includes markings identical to the markings on the inner portion of the base wheel.

The markings of the base wheel are organized in rings. From the center of the base wheel out towards the periphery, the rings are designated 40, 41, 42, . . . 50. An arbitrary astrological identification (not shown) occupies the band between rings 40 and 41 and is used primarily to define a minimum diameter for ring 41 for visual comfort. The band between rings 41 and 42 is occupied by twelve radial lines 60, 61, . . . 71 which divide the band into 30° units. A sign of the Zodiac, 80, 81 . . . 91, occupies each unit as is clear from FIG. 3. The band between rings 42 and 43 includes three hundred and sixty radial lines 190 which correspond to the degrees of arc of a circle. The band between rings 44 and 45 also includes three hundred and sixty radial lines 100 also corresponding to degrees of arc.

As is clear from a glance at FIG. 4, the inner wheel, to this point, is identical to the inner portion of the base wheel and the rings, radial lines and symbols on the two wheels are being designated alike to underscore this identity.

But the base wheel includes additional rings of larger diameter as is clear from FIG. 3. Rings 46 and 47 define a band which corresponds to band 20 of FIG. 2. Thus, all the radial lines and symbols shown in FIG. 2 move in this band when dial 12 is rotated about center line 110 of FIG. 1 during use.

The base wheel also includes rings 48 and 49 of still larger diameters. These rings define a band 111 again including three hundred and sixty radial lines corresponding to the degrees of arc of a circle.

The compass of FIG. 1 is assembled and prepared for use by placing base wheel over base 11 so that bolt 13 protrudes through center hole 121. Inner wheel 31 is then placed over the base wheel with bolt 13 protruding through center hole 121. Nut 15 is then fastened down onto bolt 13 securing inner wheel 31 in a fixed position with respect to base wheel 30. Dial 12 is then placed over nut 15 and is free to move its radial lines and symbols in the band (20) between rings 46 and 47 as shown in FIG. 3. A washer, not shown, may be used around nut 15 to facilitate the movement of the dial.

Each of the inner wheel and outer wheel include additional planetary symbols. These symbols are confined to the outer band in each wheel, between rings 49 and 50 of base wheel 30 as shown in FIG. 3 and between rings 43 and 44 of the inner wheel as shown in FIG. 4. In addition, each of the wheels includes radial lines between rings 47 and 48 of base wheel 30 as shown in FIG. 3 and between rings 45 and 46 of the inner wheel as shown in FIG. 4. The radial lines, in each instance, correspond to planetary symbols in the associated band, and identify the actual positions of those symbols. The planetary symbols for the date and time of birth are copied onto the base wheel. The planetary positions on a chosen date are copied onto the inner wheel. The two wheels are aligned by registering the fiduciary marks 120 and 121, at ring 46 on each of the base and inner wheels, with the like designated mark on the other ring. The signs of the Zodiac on the two wheels are now in identical positions. Nut 15 is now locked in place fixing the relative positions of the base and inner wheels with respect to one another. The dial is now placed over the wheels to rotate on nut 15.

The dial serves the purpose of relating the data represented on the base and inner wheels. Remember that the dial is transparant. Accordingly, the data on both wheels are clearly visible to the user. The (twelve) symbols on the dial at the 0, 45, 60, 90, 120, 135 and 180 degree positions represent the major aspects that combine the planetary influences geometrically. There are also small circles every twenty two and one half degrees which represent minor aspects. The influence of any planetary factor is examined by turning the dial until the symbol for zero degrees meets the position line of a planetary symbol (factor) on either wheel and the compass is placed so that the 0 degree symbol is at the top away from the user. A planetary picture of the favorable and unfavorable decisions for the chosen date (represented on the inner wheel) is provided.

The planetary picture is determined by the proximity between the position lines for the planetary symbols on the wheels and the major aspect lines on the dial. Planet position lines within about five degrees of major aspect symbols on the dial provide favorable indications for that aspect. Another facet of the planetary picture is determined by the proximity of position lines of planetary symbols and the minor aspect symbols on the dial. For example, if the 0 degree symbol on the dial is aligned with the position of the sun on the outer wheel and the aspects on the dial are examined, the following formulae defines the planetary picture: Sun=conjunction Mercury, Node, semisquare Venus, Mars, sextile Meridian, square Jupiter, trine Poseiden, sesqui-square Apollon, Vulcanus. If the aspect symbols are omitted from the formulae, we have: Sun=Mercury, Node, Venus, Mars, Meridian, Jupiter, Poseiden, Apollon, Vulcanus.

The compass relates any two sets of data for a given individual or for two individuals. For example, in the illustrative embodiment, sets of data representative of birth data for an individual and representative of a chosen date are selected. Data representative of the time and birth of two individuals could be compared in the same manner. Accordingly, the celestial compass can be used to establish compatibility between two individuals.

A chart of the various symbols along with the associated astrological name and abbreviation is shown in FIG. 5.

The various figures show the base, the inner and base wheels, and the dial on a scale smaller than their actual dimensions. In practice the base 11 and the base wheel 30 have diameters of about 10 inches. The inner wheel 31 has a diameter of about $6\frac{1}{4}$ inches and the dial 12 has a diameter of about 8 inches, with the inner and outer diameters of band 20 measuring $6\frac{1}{4}$ inches and $7\frac{3}{8}$ inches respectively. Such dimensions have been found to accommodate the degree of precision required of the symbols and graduations of the celestial compass yet allow easy readability and alignment of the wheels and dial.

What is claimed is:

1. A celestial compass comprising:
   a base member having a spindle at its center;
   a locking member adapted to be secured to said spindle and providing a bearing surface thereon; and
   a transparent plate adapted to rotate on said bearing surface, said transparent plate including a first band comprising radial markings representative of degrees of arc of a circle and including symbols representative of major and minor astrological aspects at designated arcuate positions in said band.

2. A celestial compass in accordance with claim 1 wherein said locking member is adapted to secure first and second wheels to said base member.

3. A celestial compass in accordance with claim 2 also including first and second wheels, said wheels bearing like astrological reference markings with respect to which astrological data can be placed, said wheels having a small and relatively large diameter and being adapted such that said like reference markings are aligned when secured about said spindle by said locking member.

4. A celestial compass in accordance with claim 3 wherein each of said first and second wheels includes a plurality of bands of successively larger diameter each bearing radial markings representative of the degrees of arc of a circle, said bands of said first wheel corresponding in diameter to bands on said second wheel, said first and second wheels including second and third bands adapted for receiving first and second sets of planetary symbols and position data representative of first and second sets of astrological data respectively.

5. A celestial compass in accordance with claim 4 wherein said second and third bands have diameters such that when said first and second wheels are secured in place on said base member by said locking member said second and third bands define a separation band therebetween which corresponds to said first band on said transparent plate.

6. A celestial compass comprising:
   first and second means for representing first and second sets of planetary symbol and position data in the context of like astrological reference representations in first and second spaced-apart bands;
   means for aligning said first and second means in fixed positions with respect to one another; and
   dial means bearing markings of a form and in positions between said first and second bands for organizing said first and second sets of data, said dial means being adapted to move said markings to different positions between said first and second bands.

7. A wheel having a surface bearing Zodiac symbols in a first band and also having second and third bands of successively larger diameter, said second and third bands being spaced apart and each including radial markings representative of the degrees of arc of a circle, said wheel providing space to first and second sides of said third band for placing astrological symbol and associated position data respectively in the context of said Zodiac symbols and degree of arc representations.

8. A wheel in accordance with claim 7 wherein said astrological symbols are placed to said first side inward of said third band and corresponding radial markings indicative of the positions of said astrological symbols are placed to said second side outward of said third band.

9. A wheel in accordance with claim 7 wherein said astrological symbols and associated radial position markings are placed to first and second sides of said third band outward of and inwards of said third band respectively.

10. First and second wheels in accordance with claim 7, said wheels having astrological symbols and associated radial position markings to first and second sides of respective third bands, said third bands of said first and second wheels having relatively small and relatively large diameters respectively, said position markings of said first and second wheels extending outwardly and inwardly from the respective third band, said small and relatively large diameters being chosen to define a separation band between said position markings.

* * * * *